United States Patent [19]

Hartmann et al.

[11] Patent Number: 5,008,321

[45] Date of Patent: Apr. 16, 1991

[54] PREPARATION OF STABLE WATER-IN-OIL EMULSIONS OF HYDROLYZED POLYMERS OF N-VINYLAMIDES AND THEIR USE

[75] Inventors: Heinrich Hartmann, Limburgerhof; Walter Denzinger, Speyer; Michael Kroener, Mannheim; Norbert Sendhoff, Gruenstadt; Enrique Freudenberg, Schifferstadt, all of Fed. Rep. of Germany

[73] Assignee: BASF Aktiengesellschaft, Ludwigshafen, Fed. Rep. of Germany

[21] Appl. No.: 438,034

[22] Filed: Nov. 20, 1989

[30] Foreign Application Priority Data

Dec. 20, 1988 [DE] Fed. Rep. of Germany ....... 3842820

[51] Int. Cl.$^5$ .............................................. C08F 2/32
[52] U.S. Cl. ................................... 524/378; 524/801
[58] Field of Search ................................. 524/378, 801

[56] References Cited

U.S. PATENT DOCUMENTS 4,421,602 12/1983 Brunnmueller et al. .
4,623,699 11/1986 Brunnmueller et al. .

FOREIGN PATENT DOCUMENTS 0216387 4/1987 European Pat. Off. .
0231901 8/1987 European Pat. Off. .
0262577 4/1988 European Pat. Off. .
0264649 4/1988 European Pat. Off. .
1562417 3/1980 United Kingdom .

Primary Examiner—Joseph L. Schofer
Assistant Examiner—Jeffrey T. Smith
Attorney, Agent, or Firm—Oblon, Spivak, McClelland, Maier & Neustadt

[57] ABSTRACT

Stable water-in-oil emulsions of hydrolyzed polymers of N-vinylamides of the formula

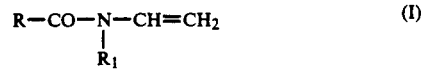

where R and $R^1$ are each H or $C_1$–$C_6$-alkyl are prepared by polymerization of a compound of the formula I alone or as a mixture with other monoethylenically unsaturated monomers, in the form of a water-in-oil emulsion, to give a water-in-oil polymer emulsion, and subsequent hydrolysis of the polymer, by a process in which hydrolysis of the polymer in the form of the water-in-oil polymer emulsion is carried out in the presence of an acid or base and of from 1 to 30% by weight, based on the polymer, of an emulsifier which is obtainable by (A) reacting a $C_{10}$–$C_{22}$-fatty alcohol with epichlorohydrin in a molar ratio of from 1:0.5 to 1:1.5 to give a glycidyl ether, (B) reacting the glycidyl ether with (1) a saturated $C_2$–$C_6$-alcohol containing from 2 to 6 OH groups or (2) its monoether with a $C_{10}$–$C_{22}$-fatty alcohol, in a molar ratio of glycidyl ether to (1) or (2) of from 1:0.5 to 1:6, in the presence of an acid or base, and (C) alkoxylating the reaction product from (B) with one or more $C_2$–$C_4$-alkylene oxides in a molar ratio of from 1:1 to 1:6.

The polymer emulsions obtainable in this manner are used as drainage aids, retention aids and flocculants in the making of paper and paper products.

5 Claims, No Drawings

PREPARATION OF STABLE WATER-IN-OIL EMULSIONS OF HYDROLYZED POLYMERS OF N-VINYLAMIDES AND THEIR USE

Partially hydrolyzed polymers of N-vinylformamide are disclosed in, for example, U.S. Pat. No. 4,421,602. The linear basic polymers described therein contain, as characteristic components, from 90 to 10 mol % of vinylamine units and from 10 to 90 mol % of N-vinylformamide units. They are prepared by polymerization of N-vinylformamide and hydrolysis of the polymers in dissolved form in the presence of acids or bases. Although the polymerization of the N-vinylformamide can also be carried out in the form of a water-in-oil polymerization, stable water-in-oil emulsion of the hydrolyzed polymers cannot be prepared from the products by hydrolysis.

U.S. Pat. No. 4,623,699 discloses a process for the preparation of linear, basic powder polymers which contain copolymerized vinylamine and N-vinylformamide units, in which powder polymers of N-vinylformamide are hydrolyzed with a gaseous hydrohalic acid in the presence of not more than 5% by weight, based on the polymer used, of water. Hydrolysis of the polymer is preferably carried out in the absence of water. The particle size of the N-vinylformamide polymer is from 10 to 1,000 μm, preferably from 50 to 400 μm.

EP-A-0216387 discloses a process for the preparation of water-soluble copolymers containing copolymerized vinylamine units by copolymerization of
(a) from 95 to 10 mol % of N-vinylformamide with
(b) from 5 to 90 mol % of an ethylenically unsaturated monomer from the group consisting of vinyl acetate, vinyl propionate, $C_1$–$C_4$-alkyl vinyl ethers, N-vinylpyrrolidone, esters, nitriles and amides of acrylic acid and methacrylic acid, and subsequent hydrolysis of the copolymer,
in which from 30 to 100 mol % of the formyl groups are eliminated from the copolymer. Although the polymers can be prepared as a water-in-oil emulsion, the hydrolysis is carried out in aqueous suspension or in an aqueous solution in the form of a paste.

EP-A-0231901 discloses the preparation of particularly high molecular weight polymers of N-vinylformamide, in which especially purified N-vinylformamide in the form of a water-in-oil emulsion is subjected to polymerization.

EP-A-0262577 and EP-A-0264649 likewise disclose the polymerization of N-vinylformamide and of substituted N-vinylamides in the form of a water-in-oil emulsion, but here too hydrolysis is carried out in each case in aqueous solution.

Dilute aqueous solutions of high molecular weight polymers containing copolymerized N-vinylamine units have a very high viscosity. For example, 5% strength aqueous solutions can no longer be pumped. Hence, water-in-oil polymer emulsions which have a relatively low viscosity even at polymer contents of from 20 to 40% by weight and can therefore be pumped are suitable for commercial use of hydrolyzed polymers of N-vinylamides.

British Patent 1,562,417 discloses a process for the preparation of water-in-oil dispersions of acrylamide polymers which do not settle out, in which process the polymerization is carried out in the presence of emulsifiers which are obtainable by reacting glycidyl ethers of $C_{10}$–$C_{22}$-fatty alcohols with dihydric to hexahydric alcohols of 2 to 6 carbon atoms or their monoethers which are derived from $C_{10}$–$C_{22}$-alcohols, in a molar ratio of glycidyl ether to alcohol of from 1 : 0.5 to 1 : 6. These emulsifiers may furthermore have been reacted with alkylene oxides of 2 to 4 carbon atoms in a molar ratio of from 1 : 1 to 1 : 6.

It is an object of the present invention to provide a process for the preparation of stable water-in-oil emulsions of hydrolyzed polymers of N-vinylamides, and the water-in-oil polymer emulsions of the partially or completely hydrolyzed N-vinylamides should be easy to handle and undergo inversion in the presence of wetting agents, so that the polymer rapidly dissolves in water.

We have found that this object is achieved, according to the invention, by a process for the preparation of stable water-in-oil emulsions of hydrolyzed polymers of N-vinylamides of the formula

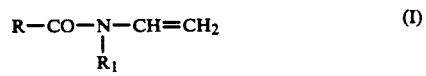

where R and $R^1$ are each H or $C_1$–$C_8$-alkyl, by polymerization of a compound of the formula I alone or as a mixture with other monoethylenically unsaturated monomers in the presence of a polymerization initiator and an emulsifier, in the form of a water-in-oil emulsion, to give a water-in-oil polymer emulsion, and subsequent hydrolysis of the polymer, if the hydrolysis of the polymer in the form of the water-in-oil polymer emulsion is carried out in the presence of an acid or base and of from 1 to 30% by weight, based on the polymer, of an emulsifier which is obtainable by (A) reacting a $C_{10}$–$C_{22}$-fatty alcohol with epichlorohydrin in a molar ratio of from 1 : 0.5 to 1 : 1.5 to give a glycidyl ether, (B) reacting the glycidyl ether with (1) a saturated $C_2$–$C_6$-alcohol containing from 2 to 6 OH groups or (2) its monoether with a $C_{10}$–$C_{22}$-fatty alcohol, in a molar ratio of glycidyl ether to (1) or (2) of from 1 : 0.5 to 1 : 6, in the presence of an acid or base, and (C) alkoxylating the reaction product from (B) with one or more $C_2$–$C_4$-alkylene oxides in a molar ratio of from 1 : 1 to 1 : 6.

The polymerization of the vinylamides of the formula I is preferably carried out with the abovementioned emulsifiers already present. The water-in-oil polymers thus obtainable are easy to handle and are used as retention and drainage aids and as flocculants in papermaking.

The preparation of stable water-in-oil emulsions of hydrolyzed polymers of N-vinylamides is carried out in two process steps. In the first process step, a water-in-oil emulsion of poly-N-vinylamides is prepared by subjecting N-vinylamides of the formula

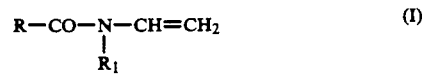

where R and $R^1$ are each H or $C_1$–$C_6$-alkyl, to polymerization. Preferably used N-vinylamides are those in which R and $R^1$ are each H, ie. N-vinylformamide. Other suitable N-vinylamides of the formula I are, for example, N-vinyl-N-methylformamide, N-vinylacetamide and N-vinyl-N-methylacetamide.

The N-vinylamides can also be copolymerized together with other copolymerizable monoethylenically unsaturated water-soluble monomers. Such comonomers are, for example, monoethylenically unsaturated $C_3-C_5$-carboxylic acids, their basic esters, nitriles and amides. Specific examples of compounds of this type are acrylic acid, methacrylic acid, maleic acid, fumaric acid, crotonic acid, itaconic acid, acrylamide, methacrylamide, acrylamidoglycolic acid, acrylonitrile, methacrylonitrile, methyl acrylate, methyl methacrylate, dimethylaminoethyl acrylate, dimethylaminoethyl methacrylate, diethylaminoethyl acrylate, diethylaminoethyl methacrylate, sulfo-containing monomers, eg. vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid, and monomers containing phosphonate groups, such as vinyl phosphonate, allyl phosphonate, methallyl phosphonate and acrylamidomathylpropanephosphonic acid. Hydroxyalkyl esters of acrylic acid and methacrylic acid, for example 2-hydroxyethyl acrylate, 2-hydroxypropyl acrylate, 3-hydroxypropyl acrylate and 2-hydroxyethyl methacrylate and hydroxypropyl methacrylate, are also suitable. This group of monomers includes vinylglycol, N-vinylpyrrolidone, N-vinylcaprolactam, N-vinylimidazole, N-vinylmethylimidazole, N-vinyl-2-methylimidazoline, N-vinyl-2-ethylimidazoline, vinyl acetate, vinyl propionate, vinyl butyrate and mixtures of the stated monomers. Those ethylenically unsaturated monomers which contain carboxylic acid groups, sulfo groups or phosphonic acid groups are preferably used in the polymerization in partially or completely neutralized form. Alkali metal bases, such as sodium hydroxide solution or potassium hydroxide solution, or ammonia or amines, eg. trimethylamine, ethanolamine or triethanolamine, are preferably used for neutralization The basic monomers are preferably employed in the form of the salts with mineral acids, eg. hydrochloric acid or sulfuric acid, or in quaternized form (suitable quaternizing agents are, for example, dimethyl sulfate, diethyl sulfate, methyl chloride, ethyl chloride and benzyl chloride). For the preparation of water-in-oil polymers, the monomers are generally first dissolved in water. Those comonomers which are not so readily soluble in water, for example acrylonitrile, methacrylonitrile or butyl methacrylate, are therefore used in the polymerization in a maximum amount corresponding to their solubility in water or in the aqueous monomer solution. In the first stage of the novel process it is preferable first to prepare water-inoil polymer emulsions of homopolymers of N-vinylformamide or copolymers of (a) from 95 to 10 mol % of N-vinylformamide and
(b) from 5 to 90 mol % of an ethylenically unsaturated monomer from the group consisting of vinyl acetate, vinyl propionate, the $C_1-C_4$-alkyl vinyl ethers, N-vinylpyrrolidone and the esters, nitriles and amides of acrylic acid and methacrylic acid.

The copolymers should contain not less than 10 mol % of N-vinylformamide as copolymerized units.

In the copolymerization, it is also possible concomitantly to use a further group of monomers (c) which are soluble in water and have a diethylenically or polyethylenically unsaturated molecule These are crosslinking agents, for example methylenebisacrylamide, N,N'-divinylethyleneurea, N,N'-divinylpropyleneurea, ethylidenebis-3-vinylpyrrolidone and acrylates, methacrylates and maleates of dihydric or polyhydric alcohols, eg. ethylene glycol diacrylate, ethylene glycol diacrylate and ethylene glycol dimethacrylate. Other suitable esters of this type are obtained, for example, in the esterification of polyhydric alcohols, eg. glycerol, pentaerythritol, glucose, fructose, sucrose, polyalkylene glycols having a molecular weight of from 400 to 2,000 or polyglycerols having a molecular weight of from 126 to 368, with acrylic acid, methacrylic acid or maleic acid, not less than 2 moles of one of the stated carboxylic acids or a mixture of the stated carboxylic acids being used per mole of the alcohol employed. If water-soluble crosslinking agents are used in the polymerization of the N-vinylamides alone or as a mixture with other water-soluble monomers, the amount of crosslinking agents is from 100 to 20,000 ppm, preferably from 100 to 10,000 ppm, based on the total monomer mixture.

An aqueous monomer solution which has a pH of from 4 to 9, preferably from 5 to 8, is first prepared. In many cases it is advisable also to carry out the procedure in the presence of buffers, for example to add primary or secondary sodium phosphate to the aqueous phase. The concentration of the monomers in the aqueous solution is from 5 to 60, preferably from 10 to 50, % by weight.

The aqueous monomer phase is emulsified in a hydrophobic organic dispersion medium. Suitable organic, virtually water-immiscible liquids are straight-chain and branched aliphatic hydrocarbons, such as pentane, hexane, octane, isooctane, decane, dodecane, liquid paraffins and liquid saturated hydrocarbon mixtures whose boiling points under atmospheric pressure (1,013 mbar) are in the range from 120 to 350° C. In addition to straight-chain and branched aliphatic hydrocarbons, saturated cyclic hydrocarbons, such as cyclohexane, methylcyclohexane, dimethylcyclohexane, ethylcyclohexane, cyclopentane, cycloheptane and cyclooctane, can also be used. It is also possible to employ mixtures of the stated hydrocarbons, as usually present in gasoline cuts. Such mixtures can also contain aromatic hydrocarbons. Pure aromatic hydrocarbons, such as toluene, xylenes, ethylbenzene, cumene and benzene, and chlorohydrocarbons, such as perchloroethylene, tetrachloroethylene, 1,1,1-trichloroethane and carbon tetrachloride, can also be used as the hydrophobic organic dispersion medium. Mixtures of saturated hydrocarbons which contain up to 20% by weight of naphthenes are preferably used. The saturated hydrocarbons consist mainly of n- and isoparaffins. The boiling range of such hydrocarbon mixtures under 1,013 mbar is from 150 to 260° C. (determined according to ASTMD 1078/86). The amount of the oil phase in the water-in-oil polymer emulsion is from 10 to 70, preferably from 20 to 50, % by weight.

Polymerization of the monomers is carried out in the presence of initiators which form free radicals under polymerization conditions, for example in the presence of peroxides, hydroperoxides, hydrogen peroxide, azo compounds or redox catalysts. Suitable free radical initiators are all compounds which have a half life of less than 3 hours at the particular selected polymerization temperature. If the polymerization is first initiated at a relatively low temperature and completed at a higher temperature, it is advantageous to use not less than 2 initiators which decompose at different temperatures, ie. first to use an initiator which decomposes at a relatively low temperature to initiate the polymerization and then to complete the main polymerization using an initiator which decomposes at a higher temperature. Water-soluble and water-insoluble initiators or mixtures of water-soluble and water-insoluble initiators can be used. The water-insoluble initiators are soluble in the organic phase. For example, the initiators stated can be used for the temperature ranges mentioned below.
Temperature: 40 to 60° C.:
Acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis-(4-methoxy-2,4-dimethylvaleronitrile), 2,2,-azobis(2dihydrochloride and 2,2'-azobis-(2-methylpropionamidine) dihydrochloride
Temperature: 60 to 80° C.:
Tert-butyl perpivalate, dioctanoyl peroxide, dilauroyl peroxide and 2,2'-azobis-(2,4-dimethylvaleronitrile)
Temperature: 80 to 100° C.:
Dibenzoyl peroxide, tert-butyl per-2-ethylhexanoate, tert-butyl permaleate, 2,2'-azobis-(isobutyronitrile) and dimethyl 2,2'-azobisisobutyrate
Temperature: 100 to 120° C.:
Bis-(tert-butylperoxy)-cyclohexane, tert-butyl peroxyisopropylcarbonate and tert-butyl peracetate
Temperature: 120° C. to 140° C.:
2,2-Bis-(tert-butylperoxy)-butane, dicumyl peroxide, di-tert-amyl peroxide and di-tert-butyl peroxide
Temperature: >140° C.:
p-Menthane hydroperoxide, pinane hydroperoxide, cumene hydroperoxide and tert-butyl hydroperoxide If salts of heavy metals, for example copper salts, cobalt salts, manganese salts, iron salts, nickel salts and chromium salts, or organic compounds, such as benzoin, dimethylaniline or ascorbic acid, are additionally used together with one or more of the abovementioned initiators, the half lives of the stated free radical initiators can be reduced. For example, tert-butyl hydroperoxide can be activated with the addition of 5 ppm of copper(II) acetylacetonate so that polymerization can be carried out at as low as 100° C. The reducing components of redox catalysts can also be formed, for example, from compounds such as sodium sulfite, sodium bisulfite, sodium formaldehyde sulfoxylate and hydrazine. From 100 to 10,000 ppm, preferably from 100 to 2,000 ppm, based on the monomers used in the polymerization, of a polymerization initiator or of a mixture of a plurality of polymerization initiators are used.

The polymerization can be carried out in the presence or absence of regulators. Examples of suitable regulators are mercapto compounds, such as mercaptoethanol, mercaptopropanol, mercaptobutanol, mercaptoacetic acid, mercaptopropionic acid, butyl mercaptan and dodecyl mercaptan, as well as allyl compounds, such as allyl alcohol, aldehydes, such as acetaldehyde, propionaldehyde, n-butyraldehyde and isobutyraldehyde, and formic acid. If the polymerization is carried out in the presence of regulators, from 0.05 to 5% by weight, based on the monomers used in the polymerization, of regulators are required.

The water-in-oil polymerization is carried out by the process disclosed in U.S Pat. No. 3,284,393. For this purpose, the aqueous monomer solution is emulsified in a hydrocarbon oil. In order to obtain a stable monomer emulsion, it is necessary to carry out emulsification of the aqueous monomer solution in the hydrocar-bon oil in the presence of water-in-oil emulsifiers. Such products have an HLB value of from 2 to 8. For a definition of the HLB value, see W.C. Griffin, J. Soc. Cosmetic Chem. 5 (1954), 249. Examples of suitable water-in-oil emulsifiers are sorbitan monolaurate, sorbitan monopalmitate, sorbitan monostearate, sorbitan monooleate, glycerol monooleate, glycerol sorbitan fatty acid esters, ethoxylation products of glycerol sorbitan fatty acid esters, and mannitol monooleate. With the aid of the stated water-in-oil emulsifiers it is possible to prepare more or less stable water-in-oil polymer emulsions. The polymerization may furthermore be carried out in the presence or absence of wetting agents, so that the resulting water-in-oil polymer emulsions are self-inverting when poured into water. The wetting agents are known to have HLB values of more than 8, preferably from 9 to 20. The use of wetting agents for inverting water-in-oil polymer emulsions when they are poured into water, in order to bring the polymer rapidly into solution, is disclosed in, for example, U.S. Pat. No. 3,624,019.

In a preferred embodiment of the novel process, the emulsifiers used in the preparation of the water-in-oil emulsions themselves are those which are obtainable by (A) reacting a $C_{10}$–$C_{22}$-fatty alcohol with epichlorohydrin in a molar ratio of from 1 : 0.5 to 1 : 1.5 to give a glycidyl ether, (B) reacting the glycidyl ether with (1) a saturated $C_2$–$C_6$-alcohol containing from 2 to 6 OH groups or (2) its monoether with a $C_{10}$–$C_{22}$-fatty alcohol, in a molar ratio of glycidyl ether to (1) or (2) of from 1 : 0.5 to 1 : 6, in the presence of an acid or base, and (C) alkoxylating the reaction product from (B) with one or more $C_2$–$C_4$-alkylene oxides in a molar ratio of from 1 : 1 to 1 : 6.

Emulsifiers of this type are disclosed in, for example, the abovementioned British Patent 1,562,417. For the preparation of these emulsifiers, a $C_{10}$–$C_{22}$-fatty alcohol is reacted with epichlorohydrin in the stated molar ratio to give a glycidyl ether in process stage (A). Examples of suitable fatty alcohols are oleyl alcohol, stearyl alcohol, cetyl alcohol, myristyl alcohol, lauryl alcohol, tallow fatty alcohol and the long-chain alcohols of 10 to 22 carbon atoms which are obtainable by the oxo process.

In process stage (B), the glycidyl ethers obtained in (A) are reacted with saturated $C_2$–$C_6$-alcohols containing from 2 to 6 OH groups. Examples of suitable polyhydric alcohols of this type are ethylene glycol, diethylene glycol, dipropylene glycol, butane-1,4-diol, butane-1,2,4-triol, glycerol, trimethylolpropane, sorbitol, neopentylglycol and pentaerythritol. The stated polyhydric alcohols may also have an ether group which is derived from a $C_{10}$–$C_{22}$-fatty alcohol. Suitable fatty alcohols of this type have already been mentioned above under (A). Suitable monoethers of saturated $C_2$–$C_6$-alcohols containing from 2 to 6 OH groups are, for example, 1-oleyloxypropane-2,3-diol and stearyloxypropane-2,3-diol. The glycidyl ethers are reacted with the two classes of compounds stated under (B), either alone or as a mixture, in a ratio of glycidyl ether to polyhydric alcohols or monoethers of polyhydric alcohols of from 1 : 0.5 to 1 : 6, in the presence of an acid or base.

The reaction products obtainable in this manner are then alkoxylated in reaction stage (C). Suitable alkylene oxides for this purpose are ethylene oxide, propylene oxide and butylene oxides. Ethylene oxide is preferably used. It is possible to use mixtures of ethYlene oxide and propylene oxide, ethylene oxide and butylene oxide or ethylene oxide, propylene oxide and butylene oxide for the alkoxylation of the reaction products (B). From 1 to 6 moles of alkylene oxides are used per mole of the compound from (B).

For the preparation of water-in-oil emulsions of N-vinylamide polymers, from 1 to 30% by weight, based on the monomers, of water-in-oil emulsifiers, which have been described above, are used. The polymerization of the water-in-oil monomer emulsion is carried out at from 20 to 150° C. The polymerization is preferably carried out under atmospheric pressure, but may also be effected under reduced or superatmospheric pressure to adjust the temperature. During the polymerization, thorough mixing of the reactants is ensured. In industry, stirred kettles equipped with an anchor stirrer are suitable for this purpose. The speed of the stirrer is about 100-400 rpm. The polymerization is preferably carried out so that the monomers are virtually completely polymerized. If necessary, the main polymerization can be followed by a subsequent polymerization in which, for example, further amounts of peroxide or azo compounds are added to the reaction mixture. This gives water-in-oil polymer emulsions having a polymer content of from 10 to 50% by weight. If water-in-oil polymer emulsions having an even higher polymer content are desired, the polymer content can be increased by azeotropic removal of water and hydrocarbon oil. This gives water-in-oil polymer emulsions having a polymer content of up to 70% by weight. Particularly stable water-in-oil polymer emulsions are obtained with the use of emulsifiers which can be prepared by reaction according to the process stages (A), (B) and (C) described above. Polymers of N-vinylamides of the formula I and the copolymers have K values of from 20 to 300, preferably from 50 to 280. For most applications, K values of the polymers of from 100 to 250 are of particular interest. (The K values were measured according to H. Fikentscher in 0.1% strength aqueous solutions which are obtainable by dissolving 5 g of sodium chloride and 0.08 g of the adduct of 10 moles of ethylene oxide with 1 mole of isononylphenol in 94.92 g of distilled water. The measurements were carried out in each case at 25° C.).

In the second stage of the novel process, the polymers prepared in the first stage are hydrolyzed. The polymers contain not less than 10 mol % of characteristic units of the formula

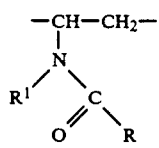
(II)

where R and $R^1$ are each H or $C_1$-$C_6$-alkyl, which are converted by hydrolysis into units of the formula

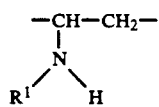
(III)

where $R^1$ is H or $C_1$-$C_6$-alkyl. Depending on the reaction conditions during the hydrolysis, ie. the amount of acid or base, based on the polymer to be hydrolyzed, and the reaction temperature during the hydrolysis, either partial or complete hydrolysis of the units of the formula (II) results. The hydrolysis of the polymers is continued until from 5 to 100%, preferably from 10 to 90%, of the monomer units of the formula II which are present in the polymers have been hydrolyzed. To carry out the hydrolysis, it is essential for the water-in-oil polymer emulsions prepared in the first process stage to contain emulsifiers which can be prepared by reaction of the compounds described above under (A), (B) and (C). These emulsifiers must be present in an amount of from 1 to 30, preferably from 2 to 20, % by weight, based on the polymers of the water-in-oil polymer emulsion, when hydrolysis of the monomer units (II) present in the polymers is carried out. In the preferred embodiment of the novel process, these emulsifiers are used in the preparation of the water-in-oil polymer emulsions themselves. However, these emulsifiers can also be added to water-in-oil emulsions of N-vinylamides of the formula I, which prepared in the presence of other, conventional water-in-oil emulsifiers. The hydrolysis is carried out under reaction conditions under which water-in-oil polymer emulsions are not usually stable. In fact, hydrolysis is carried out by adding an acid or base to the water-in-oil polymer emulsions prepared in the first process stage and containing the emulsifiers obtainable by reaction of (A), (B) and (C), or to the concentrated water-in-oil polymer emulsions likewise containing this emulsifier. Examples of acids which are suitable for the hydrolysis are mineral acids, such as hydrogen halides (gaseous or in aqueous solution), sulfuric acid, nitric acid or phosphoric acid (ortho- or meta-polyphosphoric acid), and organic acids, for example $C_1$-$C_5$-carboxylic acids, such as formic acid, acetic acid and propionic acid, or the aliphatic or aromatic sulfonic acids, such as methanesulfonic acid, benzenesulfonic acid or toluenesulfonic acid. Hydrochloric acid or sulfuric acid is preferably used for the hydrolysis. In the hydrolysis with acids, the pH is from 0 to 5. From 0.05 to 1.5, preferably from 0.4 to 1.2, equivalents of acid are required per equivalent of formyl groups.

In the hydrolysis with bases, hydroxides of metals of the first and second main groups of the Periodic Table can be used; for example, lithium hydroxide, sodium hydroxide, potassium hydroxide, calcium hydroxide, strontium hydroxide and barium hydroxide are suitable. However, it is also possible to use ammonia and alkyl derivatives of ammonia, for example alkyl- or arylamines, such as triethylamine, monoethanolamine, diethanolamine, triethanolamine, morpholine or aniline. In the hydrolysis with bases, the pH is from 8 to 14. The bases can be used in solid, liquid or, if necessary, gaseous state, diluted or undiluted. Preferably used bases for the hydrolysis are ammonia, sodium hyroxide solution and potassium hydroxide solution. The hydrolysis at acidic or alkaline pH is carried out at from 30 to 170° C., preferably from 50 to 120° C. It is complete after about 2-8, preferably 3-5, hours. After these reaction times, the resulting degrees of hydrolysis of the units of the formula II in the polymer are from 5 to 100%, preferably from 10 to 90%. A procedure in which the bases or acids are added in aqueous solution for the hydrolysis and in which the polymer concentration of the water-in-oil polymer emulsion is kept at from 20 to 50% by azeotropic distillation during the hydrolysis has proven useful. The hydrolyzed water-in-oil polymer emulsion can also be concentrated after the end of the hydrolysis, for example to polymer contents of from 25 to 70% by weight, based on the total emulsion. After the hydrolysis, neutraization is generally carried out so that the pH of the hydrolyzed water-in-oil polymer emulsion is from 2 to 8, preferably from 3 to 7. Neutralization is necessary when it is intended to prevent further hydrolysis of partially hydrolyzed polymers. The viscosity of the hydrolyzed water-in-oil polymers is from 20 to 10,000, preferably from 50 to 5,000, mPa.s at 20° C. These water-in-oil polymer emulsions are thus easy to handle. For example, they can be pumped.

When the water-in-oil emulsions of hydrolyzed polymers are used, it is desirable for these products to undergo rapid inversion when poured into water. As disclosed in U.S. Pat. No. 3,624,019 for emulsions of this type, they can be rendered invertible by adding from 0.5 to 10%, preferably from 1 to 5%, of a wetting agent which has an HLB value of not less than 9. Examples of suitable surfactants of this type are the adducts of from 8 to 30 moles of ethylene oxide with $C_8$–$C_{12}$-alkylphenols or the adducts of from 5 to 30 moles of ethylene oxide with $C_{12}$–$C_{18}$-alcohols or $C_{10}/C_{12}$-alkylsulfonates. When water-in-oil polymer emulsions containing wetting agents are poured into water, phase inversion occurs and the polymer present in the emulsions dissolves rapidly in water.

The water-in-oil emulsions of hydrolyzed N-vinylformamide polymers, which emulsions have been prepared according to the invention, are used, for example, as flocculants for the treatment of wastewaters from paper machines, as drainage and retention aids in papermaking, as dispersants and protective colloids for drilling muds, as assistants in flooding water in the secondary and tertiary production of oil, as corrosion inhibitors and as cement additives. The slightly crosslinked polymers are suitable as thickeners, for example for textile printing pastes or in cleaner formulations. In all cases, very dilute aqueous solutions are required, the said solutions being prepared by the user by inversion of wetting agent-containing water-in-oil polymer emulsions of hydrolyzed N-vinylamide polymers. The novel water-in-oil polymer emulsions do not settle out.

The K values were determined according to H. Fikentscher, Zellulosechem.ie, 13 (1932), 58–64 and 71–74; $K = k.10^3$. The K values of the copolymers were determined at a polymer concentration of 0.1% by weight in an aqueous salt solution prepared by dissolving 5 g of sodium chloride and 0.08 g of the adduct of 10 moles of ethylene oxide with 1 mole of isononylphenol in 94.92 g of distilled water. The measurements were carried out at 25° C.

The solids content of the water-in-oil polymer emulsions was determined by diluting 30 g of the emulsion with 10 g of a hydrocarbon mixture boiling within the range from 192 to 254° C. and stirring this mixture into 900 ml of acetone. The polymer was precipitated during this procedure. It was filtered off quantitatively, and the residue was taken up with 500 ml of acetone and the mixture was filtered again. Thereafter, the filter residue was dried for 15 hours at 50° C. under reduced pressure and was then weighed. The calculation was carried out using the following formula:

$$\text{Solids content in \%} = \frac{\text{weight of residue} \times 100}{30}$$

In the Examples which follow, percentages are by weight unless stated otherwise, and emulsifiers 1 and 2 to be used according to the invention were employed. They were prepared as follows:

EMULSIFIER 1

(A) Reaction of oleyl alcohol with epichlorohydrin in a molar ratio of 1 : 1 to give oleyl glycidyl ether,
(B) reaction of the oleyl glycidyl ether with glycerol in a molar ratio of 1 : 1 in the presence of $BF_3$/phosphoric acid at 80° C. and removal of the catalyst with the aid of a basic ion exchanger and
(C) ethoxylation of the reaction product from (B) with 2 moles of ethylene oxide.

EMULSIFIER 2

Process stages (A) and (B) are carried out similarly to the preparation of Emulsifier 1, except that the alkoxylation of the product obtained in process stage (B) is carried out with 1 mole of ethylene oxide.

EXAMPLE 1

In a 2 l polymerization vessel provided with an anchor stirrer, a reflux condenser, a thermometer and a nitrogen inlet and outlet, the following substances are initially taken in the stated order, while stirring: 290 g of a hydrocarbon mixture boiling within a range from 192 to 254° C., 30.25 g of Emulsifier 1, 190.5 g of freshly distilled N-vinylformamide and a solution of 3.8 g of primary sodium phosphate in 371 g of distilled water. The pH of the mixture is 6.5. The content of the vessel is then emulsified for 30 minutes at a stirrer speed of 400 rpm under a nitrogen atmosphere. Thereafter, the mixture is heated at a stirrer speed of 400 rpm. After a temperature of 40° C. has been reached, 0.285 g of 2,2'-azobis-(2,4-dimethylvaleronitrile), dissolved in 5 g of acetone, is added and the mixture is heated to 60° C. The temperature is kept for 2 hours at 60–65° C., C after which a solution of 0.055 g of 2,2'-azobis-(2,4-dimethylvaleronitrile) in 3 g of acetone is added and the reaction mixture is then heated at 75° C. for a further 2 hours. After this time, a thin, speck-free and coagulate-free emulsion having a solids content of 21.7% is obtained; the said emulsion is cooled to 50° C. and into it are passed 34.3 g of hydrogen chloride (gaseous) in the course of 0.5 hour to hydrolyze the poly-N-vinylformamide. The hydrolysis is stopped after 5 hours at 50° C. After this time, 30% of the formamide groups of the homopolymer of N-vinylformamide have been converted into amine groups. The reaction mixture is then cooled to 20° C. and is brought to a pH of 5 by passing in gaseous ammonia. 30 g of the adduct of 10 moles of ethylene oxide with 1 mole of isononylphenol are then added in the course of half an hour with thorough stirring, and the mixture is stirred for a further 2 hours. This gives a stable water-in-oil emulsion of a 30% hydrolyzed poly-N-vinylformamide This emulsion is thin and smooth and speck-free and coagulate-free. The K value of the polymer before the hydrolysis was 196 and the viscosity was 800 mPa.s. The surfactant-free and the surfactantcontaining water-in-oil polymer emulsions have a long shelf life. The surfactant-containing one undergoes inversion when poured into water, the polymer rapidly dissolving in water.

EXAMPLE 2

Example 1 is repeated with the sole exception that the same amount of Emulsifier 2 is used. A water-in-oil polymer emulsion whose polymer has a K value of 192 is obtained. The emulsion appears thin and smooth and has a solids content of 21.5%. It is speck-free and coagulate-free. The surfactant-free and surfactantcontaining (addition of 30 g of the adduct of 10 moles of ethylene oxide with 1 mole of isononylphenol) water-in-oil polymer emulsions have a long shelf life and viscosities of 390 mPa.s (surfactant-free) and 1,600 mPa.s (surfactant-containing). The surfactant-containing water-in-oil polymer emulsion is rapidly inverted on dilution with water, the polymer dissolving.

COMPARATIVE EXAMPLES 1 TO 8

For comparison with the prior art, as disclosed in, for example, EP-A-0264649, Example 1 was repeated using the emulsifiers shown in Table 1. Where the resulting emulsions were coagulate-free and speck-free (Comparative Examples 4 and 5), the hydrolysis was carried out as described in Example 1. The results and the emulsifiers used in the individual Comparative Examples are shown in Table 1.

settled out completety. The sediment could not be emulsified even by rigorous stirring.

EXAMPLE 4

The following substance are initially taken in the polymerization apparatus described in Example 1: 270.75 g of a hydrocarbon mixture boiling within a range from 192 to 254° C., 33 g of Emulsifier 1, 285.75 g of N-vinylformamide and a solution of 5 g of primary sodium phosphate in 491 g of distilled water. The pH of the mixture is 6.7. The content of the polymerization vessel is then stirred under a nitrogen atmosphere for 30

TABLE 1

| Comparative Example No. | Emulsifier | HLB value of the emulsifier | Appearance of the water-in-oil polymers | |
|---|---|---|---|---|
| | | | Directly after polymerization | After hydrolysis |
| 1 | Sorbitan monolaurate (Span 20+) | 8.6 | Pronounced coating of wall Emulsion inhomogeneous | — |
| 2 | Sorbitan monopalmitate (Span 40+) | 6.7 | Viscous emulsion with a high coagulate content | — |
| 3 | Sorbitan monostearate (Span 60+) | 4.7 | Viscous emulsion with a high coagulate content | — |
| 4 | Sorbitan monooleate (Span 80+) | 4.3 | Thin, virtually speck-free emulsion | Coagulates |
| 5 | Glycerol monostearate (Arlacel 186+) | 2.8 | Thin emulsion with few specks | Coagulates |
| 6 | Glycerol sorbitan fatty acid ester, unsaturated (Arlacel 481+) | 4.5 | Emulsion with a high speck content | — |
| 7 | Commercial adduct of ethylene oxide with glycerol sorbitan fatty ester (Arlacel 988+) | 4.7 | Emulsion with a high speck content | — |
| 8 | Mannitol monooleate (Arlacel A+) | 4.3 | Emulsion with a high speck content | — |

+Commercial products from Atlas Chemie

EXAMPLE 3

In the polymerization apparatus described in Example 1, 540 g of n-octane and 15 g of Emulsifier 1 are initially taken and heated to 50° C. at a stirrer speed of 400 rpm, under a gentle stream of nitrogen. Thereafter, 0 0.3 g of 2,2'-azobis-(2,4-divinylvaleronitrile) is added and a solution of 90 g of N-vinylformamide in 180 g of water is introduced in the course of 20 minutes. The reaction mixture is then stirred for a further 2 hours and 40 minutes at 50° C. A sample is taken and the K value of the polymer is determined. It is 208 at this point. The solids content of the water-in-oil emulsion is 10.9%.

42.9 g of 38% strength aqueous hydrochloric acid are added to the resulting water-in-oil polymer emulsion in the course of 30 minutes and the reaction mixture is heated for 5 hours at 50° C. to effect hydrolysis. After this time, 30% of the formamido groups have been hydrolyzed. A very thin, speck-free water-in-oil polymer emulsion is obtained; the said emulsion settles out slightly on standing overnight but becomes homogeneous again when gently agitated or stirred. The addition of 15 g of an adduct of 10 moles of ethylene oxide with 1 mole of isononylphenol leads to a water-in-oil emulsion of a hydrolyzed poly-N-vinylformamide, which emulsion has a long shelf life. This emulsion can be directly inverted by pouring into water.

COMPARATIVE EXAMPLE 9

Example 3 was repeated using 15 g of sorbitan monostearate (Span 60) instead of 15 g of Emulsifier 1. The resulting water-in-oil polymer emulsion was then hydrolyzed by adding aqueous hydrochloric acid, as described in Example 3. After the hydrolysis, the polymer minutes at a stirrer speed of 400 rpm and thus emulsified, and is heated. As soon as the reaction mixture has reached 40° C., a mixture of 0.427 g of 2,2'-azobis(2,4-dimethylvaleronitrile) and 0.142 g of 2,2'-azobisisobutyronitrile in 10 ml of a hydrocarbon mixture is added and the temperature of the reaction mixture is then kept at 60-65° C. for 2 hours. Thereafter, the reaction mixture is stirred for a further 2 hours at a stirrer speed of 400 rpm and at 75° C. It is then cooled to 50° C. The K value of the polymer of the water-in-oil polymer emulsion is 221. The solids content of the water-in-oil emulsion of the polymer is 26.1%.

For hydrolysis, 52.3 g of gaseous hydrogen chloride are passed in with constant stirring in the course of 30 minutes, and the reaction mixture is kept at 50° C. for a further 5 hours. Under these conditions, 30% of the formamide groups of the polymer undergo hydrolysis. The reaction mixture is cooled to 20° C. and is brought to a pH of 5 by passing in gaseous ammonia.

To render the resulting water-in-oil emulsion of a hydrolyzed -poly-N-vinylformamide, which contains 30% of N-vinylamine units, self-inverting, 30 g of an adduct of 12 moles of ethylene oxide and 6 moles of propylene oxide with a $C_{13}/C_{15}$-oxo alcohol are added in the course of 30 minutes while stirring with a stirrer speed of 400 rpm, and the reaction mixture is stirred for a further 2 hours after the end of the addition. This gives a slightly viscous, speck-free emulsion which can readily be diluted with water with rapid dissolution of the polymer.

EXAMPLES 5 TO 7

Example 1 is first repeated. Immediately after the polymerization, the resulting water-in-oil emulsion of poly-N-vinylformamide is divided into three portions and different amounts of acid are added to each for the hydrolysis. The amounts used in each of the Examples are shown in Table 2. As can be seen from this, a larger amount of acid leads to a higher degree of hydrolysis. The emulsions are each rendered self-inverting after the hydrolysis by adding the adduct of 10 moles of ethylene oxide with 1 mole of isononylphenol. The appearance of these emulsions is also stated in Table 2.

TABLE 2

| Example No. | Amount of HCl gas [g] | Degree of hydrolysis [%] | Appearance of the w/o polymer emulsion |
|---|---|---|---|
| 5 | 5.2 | 10 | Thin, speck-free |
| 6 | 22.8 | 60 | Thin, speck-free |
| 7 | 39.0 | 90 | Thin, speck-free |

EXAMPLES 8 TO 12

Example 1 is repeated, except that, in each of the Examples below, mixtures of N-vinylformamide with the comonomers stated in Table 3 are used instead of pure N-vinylformamide. The total amount of monomers in each of these Examples was 190.5 g. The amounts of gaseous hydrogen chloride used in the hydrolysis are likewise stated in Table 3.

TABLE 3

| Example No. | Monomer ratio % by weight | Amount of HCl | K value (non-hydrolysed) | Appearance of the emulsion |
|---|---|---|---|---|
| 8 | 40 VFA/60 AM | 78 g | 248 | Thin, speck-free |
| 9 | 50 VFA/50 VP | 34.1 g | 178 | Thin, speck-free |
| 10 | 50 VFA/50 AMPA | 34.1 | 228 | Thin, speck-free |
| 11 | 800 VFA/20 VAc | 35.1 | 178 | Thin, speck-free |
| 12 | 60 VFA/40 HPA | 34.1 | 194 | Thin, speck-free |

VFA = N-vinylformamide
AM = Acrylamide
VP = N-vinylpyrrolidone
VAc = Vinyl acetate
HPA = Hydroxypropyl acrylate
AMPA = Acrylamidomethanepropanesulfonic acid

EXAMPLE 13

In the reactor described in Example 1, 290 g of a hydrocarbon mixture boiling within the range from 192 to 254° C., 30.25 g of emulsifier 1, 190.5 g of N-vinylformamide and a solution of 1.9 g of primary sodium phosphate in 372 g of distilled water were initially taken. of the mixture was 6.3. The reaction mixture was heated at a stirrer speed of 400 rpm. As soon as the mixture had reached 40° C., 0.285 g of tert-butyl perpivalate and 0.14 g of tert-butyl peroctoate were added and the reaction mixture was then heated to 60° C. The reaction mixture was heated at 60–65° C. for 2 hours and then at 80° C. for a further 2 hours while stirring. The mixture was then cooled to 50° C. The polymer of the water-in-oil polymer emulsion had a K value of 240.

To hydrolyze the polymer of the water-in-oil polymer emulsion, 34.3 g of gaseous hydrogen chloride were passed in for 0.5 hour and the reaction mixture was then kept at 50° C. for a further 5 hours. Water was then removed from the said emulsion by azeotropic distillation, the polymer content increasing from the original value of 21% to 33%. In an intermediate phase, at a solids content of from 25 to about 27%, the emulsion became clear and completely transparent. The emulsion formed had a polymer content of 33% and was thin and speck-free and could readily be processed by adding the adduct of 10 moles of ethylene oxide with 1 mole of isononylphenol to give a stable emulsion which was self-invertible in water.

EXAMPLES 14 TO 18

The water-in-oil polymer emulsion described in Example 1 was hydrolyzed in various ways. The hydrolyzing agent used and the reaction conditions during the hydrolysis are shown in Table 4.

TABLE 4

| Example No. | Hydrolyzing agent | Temp. [°C.] | Further reaction time [hours] | Appearance of the emulsion |
|---|---|---|---|---|
| 14 | 77.7 g of 50% strength | 60 | 4 | Thin, speck-free |
| 15 | 55.5 g of 70% strength sulfuric acid | 60 | 4 | Thin, speck-free |
| 16 | 45.6 g of ammonia[1] (as gas) | 100 | 5 | Thin, speck-free |
| 17 | 200 g of 30% strength potassium hydroxide solution | 50 | 2.5 | Thin, speck-free |
| 18 | 142.9 g of 30% strength sodium hydroxide solution | 50 | 2.5 | Thin, speck-free |

[1]Hydrolysis was carried out in an autoclave under superatmospheric pressure.

After the hydrolysis, 30 g of the adduct of 10 moles of ethylene oxide with 1 mole of isononylphenol were added to each batch and a water-in-oil polymer emulsion which was self-invertible in water was obtained.

EXAMPLE 19

Example 1 was repeated, except that 1.9 g of formic acid were added as a polymerization regulator to the monomer phase. The solids content of the water-in-oil emulsion was 21.5%. The K value of the polymer before hydrolysis was 148. The water-in-oil emulsion of the hydrolyzed polymer was thin and speck-free.

EXAMPLE 20

The procedure described in Example 1 was followed, except that 0.935 g of methylenebisacrylamide was also added to the aqueous monomer phase. The solids content of the water-in-oil emulsion was 21.8%. A thin speck-free water-in-oil emulsion of a hydrolyzed crosslinked polymer was obtained.

EXAMPLE 21

Example 1 was repeated, except that the hydrophobic organic dispersion medium used was cyclohexane. The solids content of the water-in-oil emulsion was 21.7%. This procedure gave a polymer having a K value of 200 before hydrolysis, and, after hydrolysis, a slightly viscous speck-free water-in-oil emulsion of a partially hydrolyzed polymer.

EXAMPLE 22

Example 1 was repeated, except that the hydrophobic organic dispersion medium used was a mixture of 50% of cyclohexane and 50% of a hydrocarbon boiling within a range from 192 to 254° C. A polymer having a K value of 193 before hydrolysis was obtained. After hydrolysis, a slightly viscous speck-free water-in-oil emulsion of a 30% hydrolyzed poly-N-vinylformamide was present.

EXAMPLE 23

The following substances were initially taken in the polymerization apparatus described in Example 1: 270.75 g of a hydrocarbon mixture boiling within a range from 192 to 254° C., 33 g of sorbitan monostearate (Span 60), 285.75 g of N-vinylformamide and a solution of 5 g of primary sodium phosphate in 491 g of distilled water. The pH of the mixture was 6.6. The content of the polymerization vessel was then stirred under a nitrogen atmosphere for 30 minutes at a stirrer speed of 400 rpm and thus emulsified, and was heated. As soon as the reaction mixture had reached 40° C., a mixture of 0.427 g of 2,2'-azobis(2,4-dimethylvaleronitrile) and 0.142 g of 2,2'-azobisisobutyronitrile in 10 ml of the hydrocarbon mixture was added and the temperature of the reaction mixture was then kept at 60–65° C. for 2 hours. The reaction mixture was then stirred for a further 2 hours at 75° C. 15 g of emulsifier 1 were then added and stirring was continued for a further 30 minutes at 75° C. The mixture was cooled to 50° C. The solids content of the water-in-oil emulsion was 26.8% and the K value of the polymer was 223.

The hydrolysis and the addition of the surfactant were carried out as in Example 4. A slightly viscous emulsion which was free from specks and could readily be diluted with water with rapid dissolution of the polymer was obtained.

USE EXAMPLES

EXAMPLE 24

A pulp having a solids content of 0.7% was prepared from 48% by weight of thermomechanical pulp, 33% of chemical pulp, 15% of coated waste and 4% of uncoated waste. The pH of the pulp was 7.6. This pulp was processed on a large industrial paper machine using the following retention and drainage aids:
(a) Water-in-oil polymer emulsion according to Example 1
(b) Commercial, highly efficient water-in-oil emulsion of a polymer of acrylamide and dimethylaminoethyl acrylate. The efficiency of the two products was assessed on the basis of the drainage time,
the first-pass total retention and the filler retention. The following results were obtained:

TABLE 5

| Aid | Metered amount of polymer per t of paper produced [g] | Drainage time for 300 ml of water [sec] | First-pass total retention [%] | Ash retention [%] |
|---|---|---|---|---|
| (a) | 133 | 86 | 55.2 | 28.6 |
| (b) | 153 | 108 | 53.8 | 28.0 |

Experiment (a) is an example according to the invention and shows that better effects can be achieved with respect to the comparison (b), even with a smaller amount of polymer.

EXAMPLE 25

A pulp having a solids content of 0.9% was prepared from 55% by weight of groundwood, 12% of chemical pulp and 33% of kaolin. The pH was brought to 5.0 by adding alum. This pulp was used for making paper on a large industrial paper machine, the following being used as retention and drainage aids:
(a) According to the invention, the water-in-oil emulsion of a hydrolyzed polymer, obtained in Example 1 and
(b) for comparison with the prior art, a commercial highly efficient retention and drainage aid based on a crosslinked and ethyleneimine-grafted polyamidoamine were used. The efficiency of the aids (a) and (b) used in papermaking is shown in Table 6.

TABLE 6

| Aid | Metered amount of polymer per t of paper produced [g] | First-pass total retention [%] | Ash retention [%] | Steam consumption in t per t of paper produced |
|---|---|---|---|---|
| (a) | 500 | 70 | 55.2 | 1.1 |
| (b) | 1,000 | 58.8 | 43.0 | 1.2 |

As shown in Table 6, better effects are obtained with the product to be used according to the invention, even when a smaller amount of polymer is used, than with the comparison product (b).

We claim:
1. A stable water-in-oil emulsion of a hydrolyzed polymer of N-vinylamides, of the formula

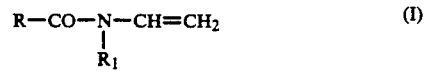

$$R-CO-N-CH=CH_2 \quad (I)$$
$$\quad\quad\quad\quad |$$
$$\quad\quad\quad\quad R_1$$

where R and $R^1$ are each H or $C_1$-$C_6$-alkyl, prepared by the steps comprising:
(a) polymerization of a compound of the formula I alone or as a mixture of other monoethylenically unsaturated monomers in the presence of polymerization initiator and emulsifiers, in the form of a water-in-oil emulsion, to give a water-in-oil polymer emulsion; and
(b) subsequent hydrolysis of the polymer in the form of the water-in-oil polymer emulsion in the presence of an acid or base and from 1–30% by weight, based on the polymer, of an emulsifier which is obtained by
(A) reacting a $C_{10-22}$-fatty alcohol with epichlorohydrin in a molar ratio of from 1:0.5 to 1:1.5 to give a glycidyl ether, (B) reacting the glycidyl ether with (1) a saturated $C_{2-6}$-alcohol containing from 2–6 OH groups or (2) its monoether with a $C_{10-22}$- fatty alcohol, in a molar ratio of glycidyl ether to (1) or (2) of from 1:0.5 to 1:6, in the presence of an acid or base, and (C) alkoxylating the reaction product from (B) with one or more $C_{2-4}$-alkylene oxides in a molar ratio of from 1:1 to 1:6.

2. The stable water-in-oil emulsion of claim 1, wherein the compound of the formula I, alone or as a mixture with other monoethylenically unsaturated monomers, in the form of a water-in-oil emulsion, is polymerized in the presence of an emulsifier which is obtainable by (A) reacting a $C_{10-22}$-fatty alcohol with epichlorohydrin in a molar ratio of from 1:0.5 to 1:1.5 to give a glycidyl ether, (B) reacting the glycidyl ether with (1) a saturated $C_{2-6}$-alcohol containing from 2–6 OH groups or (2) its monoether with a $C_{10-22}$-fatty alcohol, in a molar ratio of glycidyl ether to (1) or (2) of from 1:0.5 to 1:6, in the presence of an acid or base, and (C) alkoxylating the reaction product from (B) with one or more $C_{2-4}$-alkylene oxides in a molar ratio of from 1:1 to 1:6 to give a water-in-oil polymer emulsion and then adding an acid or base to the water-in-oil polymer emulsion to hydrolyze the units of the compound of the formula I which are present as copolymerized units in the polymer.

3. The stable water-in-oil emulsion of claim 1, wherein from 5 to 100% of the units of the compound of the formula I present as copolymerized units in the polymer are hydrolyzed.

4. The stable water-in-oil emulsion of claim 1, wherein N-vinylformamide is used as the compound of the formula I.

5. The stable water-in-oil emulsion of claim 1, wherein a copolymer of
(a) from 95 to 10 mol % of N-vinylformamide with
(b) from 5 to 90 mol % of an ethylenically unsaturated monomer from the group consisting of vinyl acetate, vinyl propionate, the $C_1$–$C_4$-alkyl vinyl ethers, N-vinylpyrrolidone and the esters, nitriles and amides of acrylic acid and methacrylic acid is hydrolyzed.

* * * * *